United States Patent [19]

Simonsen

[11] 3,867,576

[45] Feb. 18, 1975

[54] TELEPHONE TRANSMITTER CIRCUIT

[75] Inventor: Karlo Buchvaldt Simonsen, London, Ontario, Canada

[73] Assignee: Northern Electric Company, Limited, Montreal, Quebec, Canada

[22] Filed: Dec. 14, 1973

[21] Appl. No.: 424,850

[52] U.S. Cl. ............ 179/1 A, 179/121 R, 179/81 B
[51] Int. Cl. ............ H03f 1/34
[58] Field of Search ............ 179/121 R, 111 E, 1 A, 179/81 B

[56] References Cited

UNITED STATES PATENTS 3,300,585 1/1967 Reedyk .............. 179/1 A
3,555,188 1/1971 Meacham .............. 179/1 A

*Primary Examiner*—Ralph D. Blakeslee
*Attorney, Agent, or Firm*—John E. Mowle

[57] ABSTRACT

A microphone, for example an electret microphone, may be combined with an amplifier to replace a typical carbon telephone transmitter. Such a combination is modified by the addition of a controlled impedance a-c shunt load circuit between the self polarized transmitter and a typical loop circuit. The shunt load circuit co-acts with the output impedance of the amplifier to simulate the conversion efficiency of the typical carbon microphone over a range of loop circuit operating voltages.

3 Claims, 4 Drawing Figures

TELEPHONE TRANSMITTER CIRCUIT

The present invention relates to telephone transmitter circuits and more particularly to a combination of a self-polarized microphone, a semiconductor amplifier and a voltage sensitive shunt load. The combination in application simulates the conversion efficiency characteristic of a typical carbon telephone transmitter.

Most telephone switchboard and telephone switch office installations are not compatible with recently developed telephone transmitters. One such telephone transmitter is that described in U.S. Pat. No. 3,300,585 issued on Jan. 24, 1967 to C. W. Reedyk, et al. However, it is desirable to replace existing carbon transmitters with non-carbon transmitter units, exemplified by that disclosed by C. W. Reedyk, et al., so that the benefits of lightweight and low distortion and particularly of reliability are incorporated throughout a telephone system. Telephone operating companies of necessity require uniformity and compatibility in their systems. The direct introduction of non-carbon transmitters, for example an electret transmitter, usually also required elimination or modification of existing transmission line amplifiers. Hence the replacement of carbon transmitters with non-carbon transmitters can be a tedious and ill defined task which often falls outside of the typical telephone repairman or installer's capacity to perform efficiently. The cost to the operating company and the non-uniformity introduced will often outweigh the advantages of the non-carbon replacement transmitter.

The above-mentioned advantages in non-carbon telephone transmitters may be incorporated into existing telephone systems if the conversion efficiency characteristic of the transmitter unit is similar to that of the typical carbon transmitter. It has been found that a microphone-semiconductor amplifier unit, similar to that disclosed by C. W. Reedyk, et al., is suitably compatible when modified by the addition of a voltage sensitive shunt load circuit between the amplifier output and the associated telephone transmission facility. The voltage sensitive shunt load circuit regulates the effective alternating current output of the transmitter unit generally in proportion to the transmission line direct current voltage, appearing at the transmitter terminals. Hence the conversion efficiency of the microphone unit is effectively modified to approximate the audio signal amplitude output characteristics of a typical carbon transmitter and thus obviates any necessity of line amplifier changes.

The present invention is a telephone transmitter having terminals for connection to a telephone transmission facility, having a direct current voltage applied thereto removed from the terminals. The telephone transmitter comprises a semiconductor amplifier responsive to the output of a self-polarized microphone to cause fluctuations in the current carried by the transmission facility. A direct current voltage divider having a plurality of diodes is connected across the terminals. The voltage divider includes a voltage tap which provides a control voltage proportional to the terminal voltage above a certain limit as determined by the diodes. A variable impedance alternating current shunt is also connected across the terminals. The impedance of the shunt is controlled by the control voltage so that, in co-operation with the output impedance of the amplifier, the conversion efficiency characteristic of a typical carbon transmitter is substantially duplicated.

Example embodiments are described in the following with reference to the accompanying drawings in which.

Figure 1:
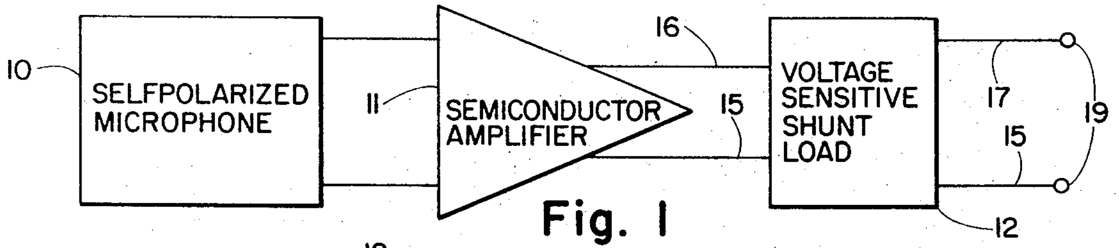
FIG. 1 is a block schematic diagram of a self-polarized telephone transmitter in accordance with the invention.

Referring to FIG. 1, a self-polarized microphone 10 for example an electret microphone, is connected to the input of a semiconductor amplifier 11. A voltage sensitive shunt load 12 is connected across a pair of terminals 19 via leads 17 and 15. The terminals 19 provide for connection to a telephone transmission facility, for example a subscriber loop circuit. One of the output terminals of the amplifier is connected via a lead 16 to the voltage sensitive shunt load 12. The other output terminal of the amplifier 12 is connected to the lead 15.

Figure 2:
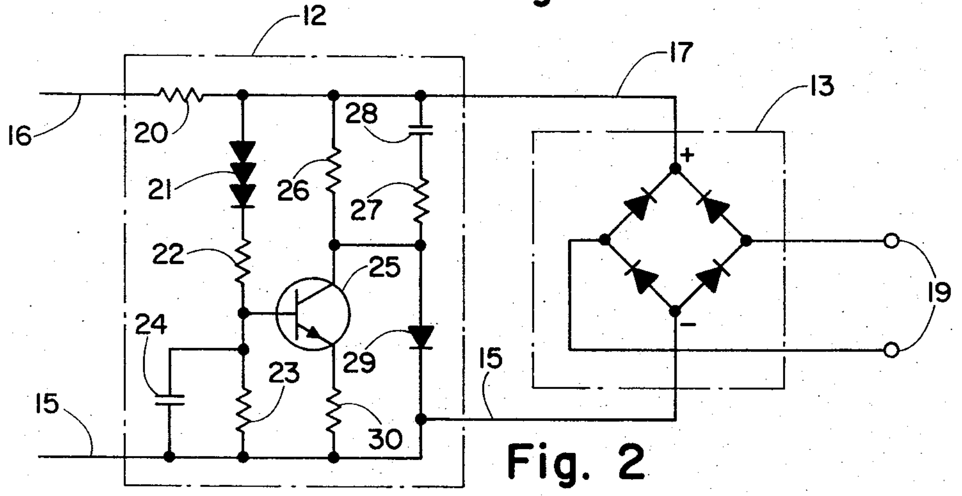
FIG. 2 is a schematic diagram of a voltage sensitive shunt load used in the transmitter illustrated in FIG. 1, in combination with a polarity guarding bridge.

Referring to FIG. 2 one embodiment of the voltage sensitive shunt load 12 is shown connected in combination with a typical polarity determining bridge circuit 13, similar to a bridge circuit disclosed in the above-mentioned patent to C. W. Reedyk, et al. As is well known, the bridge circuit 13 provides a positive potential on one side thereof, in this case on lead 17, and a negative potential on the other side, lead 15, regardless of the polarity applied to the respective terminals 19.

The shunt load 12 in FIG. 2 includes a resistor 20 connected between one side of the amplifier 11 output, via the lead 16, and the positive side of the bridge 13 via lead 17. The resistor 20 increases the effective output impedance of the amplifier 11. A series of three semiconductor diodes provide a diode series string 21 having anode and cathode terminals. The diode series string 21 is connected in series with a resistor 22 which is in turn connected in series with a parallel combination of a resistor 23 and a capacitor 24. The circuit elements 21–24 provide a non-linear direct current voltage divider with the anode terminal of the diode series string 21 being connected to the lead 17. The common junction of the resistor 23 and the capacitor 24 is connected to the lead 15 and the common junction of the resistor 22 with the resistor 23 and the capacitor 24 provide a voltage tap connected to the base electrode of an NPN transistor 25.

The collector electrode of the transistor 25 is connected to the lead 17 via a resistor 26 in parallel with a series combination of a resistor 27 and a capacitor 28. The collector electrode of the transistor 25 is also connected to the anode of a diode 29, the cathode of which is connected to the lead 15. The emitter electrode of the transistor 25 is connected to the lead 15 via a resistor 30.

In operation, the leads 17 and 15 typically have between about 1.5 to 5.0 volts potential difference impressed thereon, depending upon the operation characteristics of the transmission facility connected at the terminals 19. The capacitor 24 effectively provides an a-c ground at the base of the transistor 25. Hence voltage appearing at the voltage tap and hence at the base of the transistor 25 is substantially a d-c voltage with little or no a-c component. In the case where the voltage across leads 15 and 17 is sufficient to overcome the forward voltage drop of the series diode string 21 and the base emitter junction voltage drop in the transistor 25, current is conducted via the resistor 26, the transistor 25 and the resistor 30. The resistor 30 is about 1/30 the ohmic value of the resistor 26. The transistor 25 approaches saturation when the voltage at the terminals 19 is relatively high. In this case the voltage at the collector is less than that required for forward current conduction in the diode 29. In the case where the voltage at the terminals 19 is too low to cause a current in the voltage divider network via the base emitter junction of the transistor 25, the transistor 25 is biased OFF. The diode 29 thus conducts current in an amount substantially in proportion to the voltage drop across the resistor 26. As is well known, the a-c impedance of a typical semiconductor diode is much lower when the diode is conducting than when it is not. For example, as the transistor 25 is progressively biased from the ON condition toward the OFF condition the operating a-c conductance of the diode 29 becomes progressively greater. Hence a variable conductance alternating current path is provided by the series connections of the capacitor 28 and the resistor 27 in combination with the diode 29. Alternating current fluctuation at the output of the amplifier 11 is accordingly attenuated across the resistor 20 substantially in inverse proportion to the d-c voltage at the terminal 19. By this action the acoustical to electrical conversion efficiency of the typical carbon transmitter is substantially duplicated.

Figure 3:
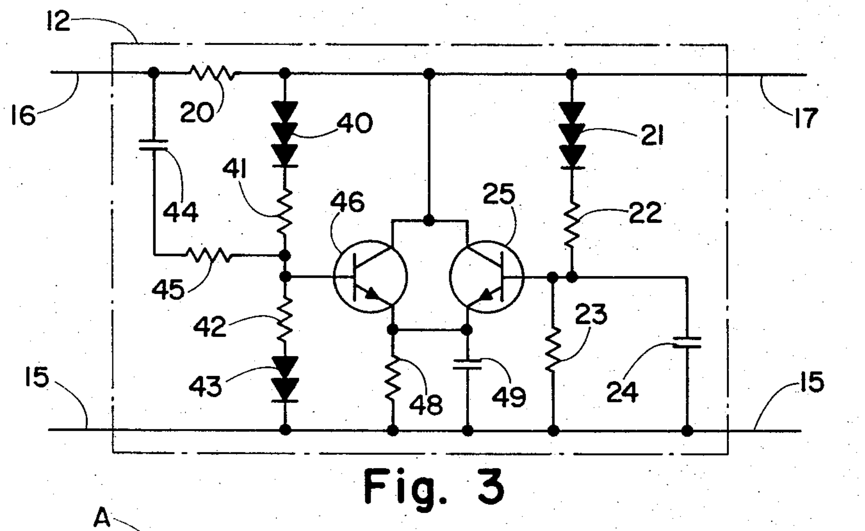
FIG. 3 is a schematic diagram of an alternate voltage sensitive shunt load used in the transmitter illustrated in FIG. 1.

The shunt load 12 in FIG. 3 operates to generally the same effect as that in FIG. 2, however with slightly lesser a-c signal distortion than that introduced by the shunt load in FIG. 2. The shunt load 12 in FIG. 3 includes the elements 20–25 substantially as in FIG. 2, however with the collector electrode of the transistor 25 being connected directly to the lead 17 and the emitter electrode of the transistor 25 being connected to the lead 15 via a parallel combination of a resistor 48 and a capacitor 49. The shunt load 12 in FIG. 3 also includes a diode series string 40 in series with resistors 41 and 42, in series with another diode series string 43. A capacitor 44 is connected in series between the lead 16 and a resistor 45 which in turn is connected to the junction of the resistor 41 and 42. The circuit elements 40–43 effectively provide a non-linear voltage divider network. The anode terminal of the diode series string 40 is connected to the lead 17. The cathode terminal of the diode series string 43 is connected to the lead 15. The junction of the resistors 41, 42 and 45 is connected to the base electrode of a transistor 46. The collector electrode of the transistor 46 is connected to the lead 17 and the emitter electrode of the transistor 46 is connected to the emitter electrode of the transistor 25. As before stated the resistor 20 increases the effective output impedance of the amplifier. In this embodiment the resistor 20 also provides some isolation between the source of the a-c signal amplified by the transistor 46 and its collector electrode.

In operation when the voltage potential between the lead 17 and the emitter electrode of the transistor 46 exceeds about 1.8 volts the diode string 40 conducts current via the base electrode of the transistor 46. Thus the transistor 46 conducts current from its collector electrode to its emitter electrode and via the resistor 48 to the lead 15. The capacitor 49 provides an a-c ground at the emitter electrode of the transistors 25 and 46. At the same time a-c fluctuations from the output of the amplifier 11 are conducted via the capacitor 44 and the resistor 45, which provide an alternating current resistance path, to the base electrode of the transistor 46. The a-c fluctuations are amplified and the resulting inverted signal at the collector electrode of the transistor 46 is added to the a-c fluctuations appearing on the lead 17 via the resistor 20. As the added signal is about 180° out-of-phase with the original a-c fluctuation, the sum effect is a reduction or attenuation of the signal from the output of the amplifier 11 across the resistor 20. As the voltage at the terminals increase in excess of about 2.4 volts the base emitter junction of the transistor 25 becomes forward biased causing current conduction through the transistor 25 also via the resistor 48. In one embodiment the resistor 48 has a resistance of about 13 ohms. In this case when the total current through resistor 48 exceeds about 40 ma, the total voltage between the base electrode of the transistor 46 and the lead 15 is sufficient to bring about conduction in the diode string 43. The a-c fluctuations appearing at the base of the transistor 46 via the resistor are then presented with an alternate low impedance path, i.e., via elements 42 and 43. Hence there is less signal amplified by the transistor 46 and less attenuation of the a-c fluctuation from the output of the amplifier 11.

The following is a list of resistor values which were found suitable in the described embodiments:

| Resistor No. | Ohmic Value |
|---|---|
| 20 | 20 ohms |
| 22 | 11K ohms |
| 23 | 30K ohms |
| 26 | 270 ohms |
| 27 | 8 ohms |
| 30 | 11 ohms |
| 41 | 11K ohms |
| 42 | 20K ohms |
| 45 | 60k ohms |
| 48 | 13 ohms |

The capacitors each provide a d-c blocking function and as such are required to be of sufficient capacitance to provide adequate coupling over the normal range of telephone speech frequencies.

In application the voltage sensitive shunt load may be physically located anywhere between a self-polarized telephone transmitter and equipment to which a typical carbon transmitter would normally be connected. In a subscriber telephone application, for example, it may be placed in the hand held portion of the telephone, or in the telephone base. During operation with a terminal voltage approaching 50V, there is some noticeable heat dissipated by the shunt loads described herein. Thus in an operator headset application, placement of the voltage sensitive shunt load circuit remote from the actual headset, i.e., away from continuous close physical contact with the operator, is preferred.

Figure 4:
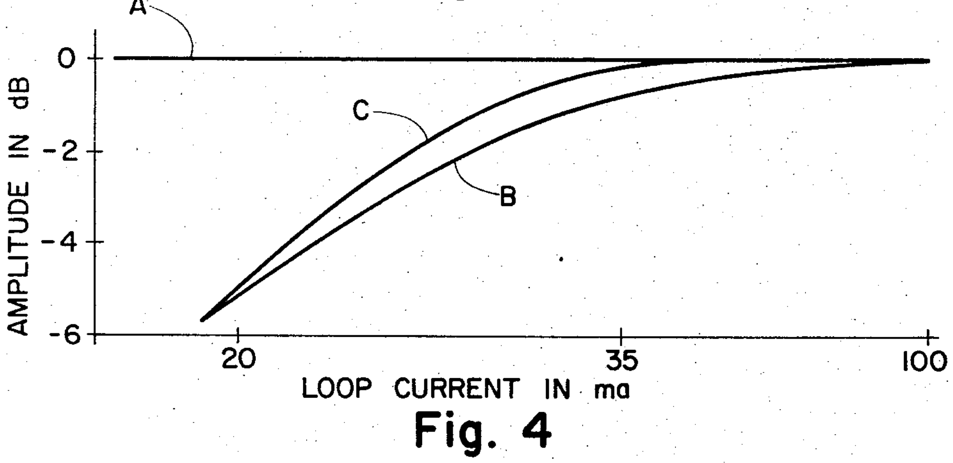
FIG. 4 is a graphical illustration of the conversion efficiency of various telephone transmitter units.

Referring to FIG. 4, the vertical axis of the graph represents a-c signal amplitude in decibels. The horizontal axis of the graph represents the current carried by a transmission facility, typically a subscriber loop circuit. Line A represents the typically constant conversion efficiency of a self-polarized microphone in series with an amplifier, similar to that disclosed by C. W. Reedyk, et al. Curve B represents the conversion efficiency of a typical carbon telephone transmitter. Curve C in substance represents the effective conversion efficiency of a transmitter unit similar to elements 10 and 11 in FIG. 1 when used in combination with a shunt load as in FIGS. 2 and 3. It will be noted that the conversion efficiency of the carbon transmitter is not ideally matched. However the match is close enough to permit the use of electret microphones in telephone transmitters in conjunction with telephone systems without experiencing any substantial problems arising from incompatibility.

What is claimed is:

1. A telephone transmitter having terminals for connection to a telephone line having a direct current voltage applied thereto remote from the terminals, comprising:

a self-polarized microphone;

a semiconductor amplifier having a substantially constant output impedance and responsive to the output of the microphone to cause fluctuations in the current carried by the telephone line;

a direct current voltage divider connected across said terminals and having a voltage tap, the voltage divider including a plurality of serially connected diodes, the forward conduction characteristics of the diodes restricting current flow through the voltage divider below a particular operating voltage at the terminals, thereby providing a control voltage at said voltage tap which is proportional to the operating voltage above said particular operating voltage;

a variable impedance alternating current shunt connected across the terminals and to the voltage tap, the impedance of the shunt being controlled by and in proportion to the control voltage;

the impedance of the shunt and the output impedance of the amplifier co-acting to substantially duplicate the acoustical to electrical conversion efficiency of a typical carbon telephone transmitter over its operating current range.

2. A telephone transmitter as defined in claim 1 further comprising:

a resistance in series between one side of the output of the amplifier and the terminal corresponding therewith, the resistance increasing the effective output impedance of the amplifier, and in which the alternating current shunt comprises:

a first resistor one end of which is connected to one of the terminals;

a diode connected in aiding current flow relationship between the other end of the first resistor and the other terminal;

a second resistor and a capacitor connected in series between the one terminal and the junction between the first resistor and the diode;

amplifying means responsive to the control voltage and having an output connected to the junction of the first resistor and the diode, the amplifying means operating to abstract current from the junction of the first resistor and the diode to reduce the voltage across the diode when the operating voltage exceeds said particular operating voltage, whereby the operating impedance of the diode is increased substantially in proportion to the operating voltage.

3. A telephone transmitter as defined in claim 1 further comprising:

a resistance in series between one side of the output of the amplifier and the terminal corresponding therewith, the resistance increasing the effective output impedance of the amplifier, and in which the alternating current shunt comprises:

a capacitive resistive combination;

a transistor having base, emitter and collector electrodes, the collector electrode connected to the one terminal, and the emitter electrode connected to the other terminal via the capacitive resistive combination, a resistive alternating current conduction path between said one side of the amplifier and the base electrode;

a voltage divider network connected between the terminals and including a first plurality of diodes connected in series aiding current flow relationship between the one terminal and the base electrode of the transistor via a resistance, the number of diodes in the first polarity determining a lower voltage limit which when exceeded, by the operating voltage, biases the transistor ON so that the signal transmitter to the base electrode via the conduction path causes the transistor to conduct an alternating current component in out-of-phase relationship with the alternating current component at the amplifier output, a second plurality of diodes connected in series aiding current relationship between the base electrode and the other terminal via a resistor, the number of diodes in the second plurality determining voltage limit at the base electrode beyond which the amount of alternating current component conducted by the transistor is reduced;

the plurality of diodes in the direct current voltage divider being at least one greater than the first plurality of diodes in the voltage divider network, amplifying means responsive to the control voltage and having an output connected to the emitter electrode of the transistor, the amplifying means operating to inject current at the emitter electrode to increase the direct current voltage at the base electrode when the operating voltage exceeds said particular operating voltage.

* * * * *